United States Patent [19]

Akamatu et al.

[11] Patent Number: 5,308,879
[45] Date of Patent: May 3, 1994

[54] PROCESS FOR PREPARING BIODEGRADABLE RESIN FOAM

[75] Inventors: Yoshimi Akamatu, Amagasaki; Masahiro Tomori, Mino, all of Japan

[73] Assignee: Nippon Gohsei Kagaku Kogyo Kabushiki Kaisha, Osaka, Japan

[21] Appl. No.: 105,681

[22] Filed: Aug. 13, 1993

[30] Foreign Application Priority Data

| Sep. 7, 1992 | [JP] | Japan | 4-238116 |
|---|---|---|---|
| Feb. 3, 1993 | [JP] | Japan | 5-040629 |
| Mar. 19, 1993 | [JP] | Japan | 5-085802 |
| Mar. 19, 1993 | [JP] | Japan | 5-085803 |
| Mar. 19, 1993 | [JP] | Japan | 5-085806 |

[51] Int. Cl.⁵ .................................. C08J 9/12
[52] U.S. Cl. .................. 521/84.1; 106/122; 264/53; 521/79; 521/109.1; 521/141
[58] Field of Search ........... 521/84.1, 109.1, 141, 521/79; 106/122; 264/53

[56] References Cited

U.S. PATENT DOCUMENTS

| 4,133,784 | 1/1979 | Otey et al. | 260/17.4 ST |
|---|---|---|---|
| 4,377,440 | 3/1983 | Gasland | 162/101 |
| 4,506,037 | 3/1985 | Suzuki et al. | 521/84.1 |
| 4,863,655 | 9/1989 | Lacourse et al. | 521/79 |
| 5,035,930 | 7/1991 | Lacourse et al. | 521/82 |
| 5,042,196 | 8/1991 | Lacourse et al. | 521/84.1 |
| 5,095,054 | 3/1992 | Lay et al. | 524/47 |
| 5,153,037 | 10/1992 | Altieri | 521/84.1 |

FOREIGN PATENT DOCUMENTS

| 0400532 | 12/1990 | European Pat. Off. |
|---|---|---|
| 4008862 | 4/1991 | Fed. Rep. of Germany |
| 2-14228 | 1/1990 | Japan |
| 2-298525 | 12/1990 | Japan |
| 3-31333 | 2/1991 | Japan |
| 4-500833 | 2/1992 | Japan |
| WO92/08759 | 5/1982 | PCT Int'l Appl. |
| WO91/02023 | 2/1991 | PCT Int'l Appl. |

*Primary Examiner*—Morton Foelak
*Attorney, Agent, or Firm*—Wenderoth, Lind & Ponack

[57] ABSTRACT

A process for producing a biodegradable resin foam, having the steps of mixing a starch polymer containing from 5% by weight to 30% by weight of water, a vinyl alcohol resin containing from 5% by weight to 30% by weight of water, a nonionic surfactant, an inorganic or organic filler, and optionally a thickening agent; optionally adjusting the water content of the mixture, to prepare a composition having from 5% by weight to 30% by weight of water on the whole, based on total weight of the composition; melting and expanding it to prepare a foam, which has a low density and fine closed cells, and shows a good surface condition in a molded body.

5 Claims, No Drawings

PROCESS FOR PREPARING BIODEGRADABLE RESIN FOAM

BACKGROUND OF THE INVENTION

1. Field of the Invention

The present invention relates to a process for preparing a biodegradable resin foam, particularly to a process for preparing a biodegradable molded foam, for example, sheet, film and wrapping materials such as cup trays, cushionings, protective sheet, protective film, etc., which comprises a starch polymer and a vinyl alcohol resin.

2. Description of the Related Art

In recent years, the interest in environmental problems has been increasing. For example, there is an increasing requirement for the development of disposal technique of synthetic polymeric materials such as plastics. Therefore, much attention has been paid to biodegradable plastics which can displace conventional plastics derived from petroleum.

As biodegradable plastics, U.S. Pat. No. 4,133,784 discloses a composition comprising starch and ethylene/acrylic acid copolymer (EAA) and Japanese Patent Kokai No. 31333/1991 discloses a composition comprising ethylene/vinyl alcohol copolymer (EVOH) and a modified starch.

An expandable material comprising a biodegradable plastic is disclosed in Japanese Patent Kokai No. 298525/1990. The material described in the published patent uses water as a blowing agent, but is not satisfactory for use in, for example, packing in view of elastic property and compressive strength.

Japanese Patent Kokai No. 14228/1990 discloses an expandable material comprising water-containing starch and a substantially water-insoluble synthetic thermoplastic polymer.

Japanese Patent Kokai No. 500833/1992 discloses an expanded article of biodegradable plastic comprising starch and EAA and/or EVOH.

These foams of biodegradable plastic are produced by adding a plasticizer such as glycerin and a blowing agent to a starch/EVOH composition, mixing, melting and extruding them. They have a low density of, for example, 0.6 g/cc. However, there are both of open cells and closed cells in them. The cell size is not uniform. Moreover, they have cavities all over their surface produced by the release of the blowing agent, which gives uneven and rough surface.

In addition, since natural starch contains water, it is alphalized and melted by kneading it in an extruder under an elevated pressure. The melt is expanded by keeping is under atmospheric pressure. The foam thus produced considerably lacks water-resistance and strength in use for an industrial cushioning material.

SUMMARY OF THE INVENTION

It is an object of the present invention to provide a process for preparing a foam of a biodegradable resin which has sufficient water-resistance and strength in despite of a high magnification of foaming, using a water-containing starch and a water-containing vinyl alcohol resin.

The present invention provides a process for producing a biodegradable resin foam, comprising the steps of mixing a starch polymer containing from 5% by weight to 30% by weight of water, a vinyl alcohol resin containing from 5% by weight to 30% by weight of water, a nonionic surfactant and an inorganic or organic filler; optionally adjusting a water content of the mixture, to prepare a composition which contains from 5% by weight to 30% by weight of water, based on total weight of the composition; melting and expanding it to obtain a foam.

More specifically, the present invention uses a starch polymer containing from 5% by weight to 30% by weight of water and a vinyl alcohol resin containing from 5% by weight to 30% by weight of water as starting materials. A nonionic surfactant, an inorganic or organic filler, and optionally a thickening agent is added thereto and, if necessary, a water content of the composition is adjusted to prepare a composition which contains from 5% by weight to 30% by weight of water, based on the total weight of the composition. Then the composition is melted and expanded to prepare a foam. The present invention will be explained in details hereinafter.

DETAILED DESCRIPTION OF THE INVENTION

The process according to the present invention uses a starch polymer and a vinyl alcohol resin as biodegradable resins. The weight ratio of the starch polymer to the vinyl alcohol resin is usually in the range of from 2:8 to 8:2. A too low ratio of the starch polymer leads to lack of biodegradability or decomposability of the foam produced, whereas a too high ratio of it results in poor mechanical properties of the foam.

The ratio of the biodegradable resins, i.e. the starch polymer and the vinyl alcohol resin, in the composition is usually from 40% by weight to 95% by weight, preferably from 50% by weight to 90% by weight.

Starch polymers include natural starch such as corn starch, potato starch, sweet potato starch, wheat starch, Cassava starch, sago palm starch, tapioca starch, rice starch, soybean starch, arrow root starch, bracken starch, lotus starch, water caltrop starch, etc.; physically modified starch such as α-starch, fractionated starch, moisture and heat-treated starch, etc; enzyme modified starch such as hydrolyzed dextrin, enzyme-hydrolyzed dextrin, amylose, etc.; chemically decomposed starch such as acid-treated starch, hypochloric acid-oxidized starch, dialdehyde starch, etc.; chemically modified starch such as esterified starch, etherified starch, cationized starch, crosslinked starch, etc.; and the like and the combination of two or more of these starches. Examples of the esterified starch in the chemically modified starch are acetic acid-esterified starch, succinic acid-esterified starch, nitric acid-esterified starch, phosphoric acid-esterified starch, urea phosphoric acid-esterified starch, xanthic acid-esterified starch, acetoacetic acid-esterified starch, etc. Examples of the etherified starch are allyl etherified starch, methyl etherified starch, carboxymethyl etherified starch, hydroxymethyl etherified starch, hydroxypropyl etherified starch, etc. Examples of the cationized starch are a reaction product of starch and 2-diethylaminoethyl chloride, and that of starch and 2,3-epoxypropyltrimethylammonium chloride.

Herein the term "vinyl alcohol resin" is used to mean a homopolymer or a copolymer comprising vinyl alcohol units. Vinyl alcohol resins include partially or completely hydrolyzed polyvinyl acetate, i.e. polyvinyl alcohol (referred to as "PVA" hereinafter), hydrolyzed products of a copolymer of ethylene and vinyl acetate (referred to as "EVOH" hereinafter). Vinyl alcohol resins also include saponified products of a copolymer comprising a vinyl ester, for example, vinyl acetate, vinyl propionate, vinyl benzoate, etc. and a monomer copolymerizable therewith, for example, olefins such as ethylene, propylene, isobutylene, α-octene, α-dodecene, α-octadodecene, etc.; unsaturated acids such as acrylic acid, methacrylic acid, crotonic acid, maleic acid, itaconic acid, etc., anhydrides, salts and mono- or dialkyl esters thereof; nitryles such as acrylonitrile, methacrylonitrile, etc.; amides such as acrylamide, methacrylamide, etc; olefinic sulfonic acids such as ethylenesulfonic acid, allylsulfonic acid, methalllylsulfonic acid, etc. or salts thereof; alkyl vinyl ethers; compounds containing a cationic group such as N-acrylamidemethylammonium chloride, allyltrimethylammonium chloride, dimethyldiallylammonium chloride, etc.; vinyl chloride; vinylidene chloride; compounds containing oxyalkylene group such as polyoxyethylene group, polyoxypropylene group, polyoxybutylene group, etc. Two or more vinyl alcohol resins may be used in admixture. However, vinyl alcohol resins are not limited to the compounds exemplified above.

Vinyl alcohol resins can be "post-modified", for example, oxyalkylene etherified, cyanoethylated, acetalized, urethanized or esterified.

The vinyl alcohol resin has a saponification degree of from 50 mole % to 100 mole %, preferably from 70 mole % to 100 mole %, and a polymerization degree of from 300 to 5,000, preferably from 700 to 3,000.

EVOH has the ethylene content of from 10 mole % to 60 mole %, preferably from 20 mole % to 60 mole %. The saponification degree is at least 60 mole %, preferably at least 90 mole %.

EVOH may be modified by other copolymerizable monomers such as α-olefins other than ethylene, ethylenically unsaturated carboxylic compounds (e.g. acid, anhydride, salt, ester, amide, nitrile, etc.), vinyl ethers, vinyl esters other than vinyl acetate, ethylenically unsaturated sulfonic compounds (e.g. acid, salt, etc.), and monomers containing oxyalkylene group. EVOH may be "post-modified" by means of oxyalkylene etherification, cyanoethylation, acetalation, or urethanization.

The reason why the water content of the starch polymer and the vinyl alcohol resin should be from 5% by weight to 30% by weight, and why the water content of the whole composition should be from 5% by weight to 30% by weight, preferably from 10% by weight to 20% by weight is as follows:

The water contained in the starch polymer is effective for melting and plasticizing starch. The water contained in the vinyl alcohol resin also disturbs its crystallinity to facilitate its plastication. In mixing the starch polymer and the vinyl alcohol resin, those previously containing water give better compatibility to one another to provide a foam of better physical properties than those in the form of anhydrous or low water-containing powder to which water is subsequently added.

Any method can be used for adding water. For example, water may be sprinkled over anhydrous or low water containing powder. Alternatively, the powder may be melted and water is mixed with the melt under an elevated pressure. A water soluble vinyl alcohol resin can also be used in practical use. However, in the present invention, the water content, the saponification value, the polymerization degree, the particle size, etc of the water containing polyvinyl alcohol resin is advantageously controlled so that the vinyl alcohol resin is kept in a powdery state. Since the ability for the composition to foam is low in the absence of a filler, the foam is produced in the presence of a filler in the process according to the present invention. Because a foam tends to shrink when the water content of the composition is too high, it is desirable to control the water content in a relatively low level. The water content above the upper limit makes the composition difficult to foam uniformly, whereas the one below the lower limit decreases a density of foaming.

Any one of known nonionic surfactants can be used for the composition. Among the nonionic surfactants, a nonionic surfactant of an ether type such as polyoxyethylene alkylphenyl ether, polyoxyethylene alkyl ether, polyoxyethylene-polyoxypropylene block polymer, polyoxyethylene alkylamine ether, polyoxyethylene lanolin alcohol ether is particularly preferred for the process of the present invention.

The nonionic surfactant is contained in the composition in an amount of from 0.5% by weight to 10% by weight, preferably from 2% by weight to 5% by weight, based on the total weight of the composition. When the content is less than 0.5% by weight, it is difficult to obtain a foam product having a low density since cells in the foam are broken and water vapor are released therefrom. When the content exceeds 10% by weight, a resulting low viscosity of the composition causes insufficient stability and a nonuniform cell size of the foam produced.

Natural animal or vegetable materials are useful as the organic &iller in any form of fiber, powder or particle, etc. Examples of the organic filler are cotton, flax, hemp, pulp, chaff, sawdust, etc. The organic filler is used in an amount of from 1% by weight to 50% by weight, preferably from 5% by weight to 30% by weight, based on the total weight of the composition.

Inorganic material can also be used as the filler. The inorganic filler includes talc, calcium carbonate, magnesium carbonate, clay, natural silicic acid, carbon black, white carbon, titanium white, glass beads, etc. It is contained in the composition in an amount of from 1% by weight to 30% by weight, preferably from 3% by weight to 20% by weight, based on the total weight of the composition.

The thickening agent added to the composition is used for keeping a melt viscosity of a melted composition above a definite value. It includes an agent which can crosslink the starch polymer and/or the vinyl alcohol resin which are resinous components of the composition. Examples of the thickening agent are boric acid, borax; dialdehydes such as glyoxal, malonaldehyde, succinaldehyde, glutaraldehyde, adipaldehyde, malealdehyde, 2-pentene-1,5-dialdehyde, o-phthaldialdehyde, isophthaldialdehyde, telephthaldialdehyde, etc.; formaldehyde; epichlorohydrin; acrolein; phosphorus oxychloride, trimetaphosphoric acid, urea, etc.

The thickening agent is usually contained in the composition in an amount of from 0.05% by weight to 5% by weight, based on the total weight of the composition.

The effect of the invention can be achieved when the melted composition in the step of molding, particularly in the step of injection molding has a melt viscosity larger than a definite value. That is, the composition which has been kept at a temperature of 160° C. for 5 minutes should has a melt viscosity of at least 10,000 poise. Accordingly, the amount of the thickening agent is controlled so that the composition has the above melt viscosity under the above condition.

In addition to the components described above, the composition used in the present invention may contain various additives, for example, a UV stabilizer, a flame retardant, a fungicidal agent, an antioxidant, a lubricant and a crosslinking aid, according to the required property of the foam and the intended application thereof.

The composition can be expanded in the similar manner to conventional foaming processes and the extrusion or injection foam molding machines for propylene or polystyrene can be used. The whole components of the composition according to the present invention may be mixed, introduced in an extrusion or injection foam molding machine, melted, and extruded to directly obtain a foam. However the following method is advantageously used: all or some of the components of the composition is introduced in an extruder, melted, kneaded to obtain a compounded pellets; 4hen the compounded pellets are mixed with, if any, the remaining components of the composition and provided to an extrusion or injection foam molding machine to obtain a foam.

A melting temperature in the foam molding is in the range of from 130° C. to 200° C. If the temperature is lower than 130° C., foaming is not insufficient. On the other hand, when the temperature exceeds 200° C., the resins are deteriorated.

A shear rate of a melt which is passing through a nozzle of the machine is above $10^3$ sec$^{-1}$, preferably from $10^4$ sec$^{-1}$ to $10^6$ sec$^{-1}$. The condition can increase a density of foaming and make a cell size in the foam small. The shear rate mentioned above is measured at a time when a melt passes through a nozzle of the machine, and given in $4Q/\pi r^3$, wherein Q is a discharging volume of the resins per second (cm$^3$/sec) and r is a radius (cm) of the nozzle.

Injection molding is effected at a cylinder temperature of from 130° C. to 200° C. and a mold temperature of from 10° C. to 80° C. under a injection pressure of from 200 kg/cm$^2$ to 2,000 kg/cm$^2$. Extrusion molding is effected at a die temperature of from 130° C. to 200° C. and a compression zone temperature on a screw of from 130° C. to 200° C.

EXAMPLES

The present invention will be illustrated more specifically by means of examples. In the examples, "part" and "%" are by weight unless otherwise indicated.

EXAMPLE 1

A mixture having a water content of 15.8% and consisting of 82.5 parts of potato starch containing 15.2% of water, 37.5 parts of PVA (a saponification degree: 98.5 mole %, a polymerization degree: 1,100, an average particle size: 1 mm) containing 20.0% of water, 20 parts of recycled pulp (an average particle size: 2 mm) from used news paper containing 12.3% of water, 2 parts of a nonionic surfactant (polyoxyethylene nonylphenyl ether, HLB=17) was introduced to a twin-screw extruder (a diameter: 30 mm, L/D=30) and extrusion-molded through a strand die having a nozzle of 5 mm in diameter at a temperature of 160° C. to obtain a foam. The properties of the foam obtained are given in Table 1.

EXAMPLE 2

Example 1 was repeated except that EVOH (an ethylene content: 44 mole %, a saponification degree: 99.4 mole %, an average particle size: 3 mm) was used in place of PVA. The properties of the foam obtained are given in Table 1.

TABLE 1

| Properties of foam: | Example 1 | Example 2 |
| --- | --- | --- |
| Condition of foaming | Good | Good |
| Cell structure | Closed | Closed |
| Cell size (mm) | 0.7 | 0.7 |
| Density (g/cc) | 0.06 | 0.06 |

EXAMPLES 3–5 AND COMPARATIVE EXAMPLES 1–2

Corn starch containing 12.8% of water, EVOH (an ethylene content: 38 mole %, a saponification degree: 99.4 mole %) containing 20.0% of water, a nonionic surfactant (polyoxyethylene nonylphenyl ether, HLB=17) and boric acid were introduced to a Henschel mixer in amounts given in Table 2 and mixed. The mixture was blended with rice hulls powder (a water content: 9.5%) having a particle size of under 200 meshes, flax fiber (a water content: 10.0%) of 2 mm in length, or pulp powder (a water content: 8.0%) having a particle size of under 300 meshes in amounts given in Table 2 with a tumbling mixer.

The mixture was extrusion-molded through a strand die having a nozzle of 5 mm in diameter at a temperature of 160° C. with a twin-screw extruder (a diameter: 30 mm, L/D=30) to obtain a foam. The compositions and the properties of the foams produced are given in Table 2. Comparative Examples are for the cases in which no filler was used.

TABLE 2

| | Example | | | Comparative Example | |
| --- | --- | --- | --- | --- | --- |
| | 3 | 4 | 5 | 1 | 2 |
| Composition (parts): | | | | | |
| Corn starch | 68.8 | 91.7 | 68.8 | 68.8 | 91.7 |
| EVOH | 50.0 | 25.0 | 50.0 | 50.0 | 25.0 |
| Nonionic surfactant | 2 | 2 | 2 | 2 | 2 |
| Boric acid | 0.5 | 0.5 | 0.5 | 0.5 | 0.5 |
| Rice hulls powder | 20.0 | | | | |
| Flax fiber | | 10.0 | | | |
| Pulp powder | | | 30.0 | | |
| Water content of composition (%): | 14.6 | 13.7 | 14.0 | 15.5 | 14.0 |
| Properties of foam: | | | | | |
| Condition of foaming | ○ | ○ | ○ | X | X |
| Cell structure | Closed | Closed | Closed | | |
| Cell size (mm) | 0.6 | 1.0 | 0.5 | | |
| Density (g/cc) | 0.07 | 0.08 | 0.07 | | |

○: Condition of foaming is good.
X: Condition of foaming is poor. Foamed and unfoamed parts coexisted.

EXAMPLES 6–8 AND COMPARATIVE EXAMPLES 3–4

Potato starch containing 15.2% of water, EVOH (an ethylene content: 44 mole %, a saponification degree: 99.4 mole %) containing 25.0% of water and/or PVA (a saponification degree: 98.2 mole %, a polymerization degree: 1,400) containing 30.0% of water, a nonionic surfactant (polyoxyethylene nonylphenyl ether, HLB=17) and boric acid were introduced to a Henschel mixer in amounts given in Table 3 and mixed.

The mixture was melted and kneaded in a twin-screw extruder (a diameter: 30 mm, L/D=30) at a cylinder temperature of 110° C. and a screw speed of revolution of 100 r.p.m. and extruded through a strand die at a die temperature of 110° C. to obtain compounded pellets which were not foamed. The pellets were dried with a hot-air dryer to control a water content.

The compounded pellets thus obtained were dry-blended with rice hulls powder (a water content: 9.5%) having a particle size of under 200 meshes and injection molded under the following conditions to obtain a rod-like foam.

Injection molding machine: PS60E12ASE-type, Nissei Jushi Industries Ltd.
Injection temperature: 170° C.
Shear rate at nozzle:

| Example 6 | $1.6 \times 10^4 \text{ sec}^{-1}$ |
|---|---|
| Example 7 | $13.3 \times 10^4 \text{ sec}^{-1}$ |
| Example 8 | $1.6 \times 10^4 \text{ sec}^{-1}$ |
| Comparative Examples 3 and 4 | $3.3 \times 10^4 \text{ sec}^{-1}$ |

Injection pressure: 900 kg/cm$^2$

The compositions and the properties of the compounds and the foams are summarized in Table 3.

TABLE 3

| | Example | | | Comparative Example | |
|---|---|---|---|---|---|
| | 6 | 7 | 8 | 3 | 4 |
| Composition (parts): | | | | | |
| Potato starch | 70.7 | 94.3 | 82.5 | 94.3 | 82.5 |
| EVOH | 53.3 | | 26.7 | | 26.7 |
| PVA | | 28.5 | 14.3 | 28.5 | 14.3 |
| Nonionic surfactant | 2 | 2 | 2 | 2 | 2 |
| Boric acid | 0.3 | | 0.3 | | 0.3 |
| Rice hulls powder | 20.0 | 10.0 | 10.0 | | |
| Properties of compound: | | | | | |
| Water content (%) | 16.2 | 16.5 | 16.1 | 16.5 | 16.1 |
| Melt viscosity ($\times 10^4$ poise) | 1.1 | 1.5 | 1.3 | 1.5 | 1.3 |
| Properties of foam: | | | | | |
| Condition of foaming | ○ | ○ | ○ | X | X |
| Cell structure | Closed | Closed | Closed | Closed | Closed |
| Cell size (mm) | 0.3 | 0.3 | 0.3 | 5 | 5 |
| Density (g/cc) | 0.02 | 0.03 | 0.03 | 0.06 | 0.06 |
| Elasticity | Soft | Soft | Soft | Brittle | Brittle |

The melt viscosity was measured using Koka-type flow tester under the following condition: Load: 50 kg, L/D=10/1 (mm) orifice, 160° C., 5 min.

EXAMPLES 9–10 AND COMPARATIVE EXAMPLE 5

Corn starch containing 12.8% of water, EVOH (an ethylene content: 44 mole %, a saponification degree: 99.4 mole %) containing 25.0% of water, a nonionic surfactant (polyoxyethylene nonylphenyl ether, HLB=17), boric acid and rice hulls powder (a water content: 9.5%) having a particle size of under 200 meshes or recycled pulp (a water content: 12.3%) were introduced to a Henschel mixer in amounts given in Table 4 and mixed.

The mixture was melted and kneaded with a twin-screw extruder (a diameter: 30 mm, L/D=30) at a cylinder temperature of 110° C. and a screw speed of revolution of 100 r.p.m. and extruded through a strand die at a die temperature of 110° C. to obtain compounded pellets which were not foamed.

The pellets obtained were injection molded under the following conditions to obtain a rod-like foam.

Injection molding machine: PS60E12ASE-type, Nissei Jushi Industries Ltd.
Injection temperature: 170° C.
Shear rate at nozzle: $3.3 \times 10^4 \text{sec}^{-1}$
Injection pressure: 900 kg/cm$^2$ The compositions and the properties of the compounds and the foams produced are summarized in Table 4. For comparison, the results obtained when no filler was added are also shown.

TABLE 4

| | Example 9 | Example 10 | Comp. Examp 5 |
|---|---|---|---|
| Composition (parts): | | | |
| Corn starch | 68.8 | 68.8 | 68.8 |
| EVOH | 53.3 | 53.3 | 53.3 |
| Nonionic surfactant | 2 | 2 | 2 |
| Boric acid | 0.5 | 0.5 | 0.5 |
| Rice hulls powder | 10 | | |
| Reprocessed pulp | | 10 | |
| Properties of compound: | | | |
| Water content (%) | 13.3 | 13.9 | 13.5 |
| Melt viscosity ($\times 10^4$ poise) | 1.4 | 1.5 | 0.8 |
| Properties of foam: | | | |
| Condition of foaming | ○ | ○ | X |
| Cell structure | Closed | Closed | Ununiformly foaming |
| Cell size (mm) | 0.4 | 0.4 | |
| Density (g/cc) | 0.03 | 0.03 | |

EXAMPLES 11–13

Corn starch containing 14% of water, EVOH (an ethylene content: 44 mole %, a saponification degree: 99.4 mole %) containing 30% of water, a nonionic surfactant (polyoxyethylene nonylphenyl ether, HLB=17) and boric acid were introduced to a Henschel mixer in amounts given in Table 5 and mixed.

The mixture was melted and kneaded in a twin-screw extruder (a diameter: 30 mm, L/D=30) at a cylinder temperature of 110° C. and a screw speed of revolution of 130 r.p.m. and extruded through a die having two nozzles each having a diameter of 5 mm at a die temperature of 110° C. to obtain compounded pellets which were not foamed. The pellets were dried with a hot-air dryer to control a water content as shown in Table 5.

The compounded pellet thus obtained was dry-blended with talc (for resin reinforcement, a particle size: 1.7 μm) and injection-molded under the following conditions to obtain a foam.

Injection molding machine: PS60E12ASE-type, Nissei Jushi Industries Ltd.
Temperature at discharging section of screw:
    Example 11: 180° C., Example 12: 180° C.; Example 13: 160° C.
Mold temperature:
    Example 11: 40° C.; Example 12: 40° C.; Example 13: 40° C.
Shear rate at nozzle:

| Example 11 | $3 \times 10^3 \text{ sec}^{-1}$ |
|---|---|
| Example 12 | $1.9 \times 10^5 \text{ sec}^{-1}$ |
| Example 13 | $1.9 \times 10^5 \text{ sec}^{-1}$ |

Injection pressure:

| Example 11 | 450 kg/cm$^2$ |
|---|---|
| Examples 12 and 13 | 1800 kg/cm$^2$ |

The compositions and the properties of the compounds and the foams produced are summarized in Table 5.

TABLE 5

|  | Example 1 | Example 2 | Example 3 |
|---|---|---|---|
| Composition (parts): |  |  |  |
| Corn starch | 69.7 | 69.7 | 69.7 |
| EVOH | 56.7 | 56.7 | 56.7 |
| Nonionic surfactant | 2 | 2 | 2 |
| Boric acid | 0.5 | 1.0 | 0.5 |
| Talc | 5 | 5 | 5 |
| Properties of compound: |  |  |  |
| Water content (%) | 14.8 | 15.0 | 10.0 |
| Melt Viscosity ($\times 10^4$ poise) | 1.1 | 2.0 | 4.2 |
| Properties of foam: |  |  |  |
| Condition of foaming | Good | Good | Good |
| Cell structure | Closed | Closed | Closed |
| Cell size (mm) | 0.1 | 0.1 | 0.1 |
| Density (g/cc) | 0.07 | 0.07 | 0.07 |

EXAMPLES 14–15

In the same methods as in Example 11 except that alphalized potato starch containing 9% of water was used in place of corn starch containing 14% of water, the components were mixed, compounded pellets were prepared, and injection foaming was effected.

The compositions and the properties of the compounds and the foams are summarized in Table 6.

TABLE 6

|  | Example 14 | Example 15 |
|---|---|---|
| Composition (parts): |  |  |
| alphalized potato starch | 65.3 | 77.1 |
| EVOH | 56.7 | 42.5 |
| Nonionic surfactant | 2 | 2 |
| Boric acid | 0.5 | 0.3 |
| Talc | 5 | 5 |
| Properties of compound: |  |  |
| Water content (%) | 14.5 | 15.0 |
| Melt viscosity ($\times 10^4$ poise) | 2.2 | 1.7 |
| Properties of foam: |  |  |
| Condition of foaming | Good | Good |
| Cell structure | Closed | Closed |
| Cell size (mm) | 0.1 | 0.1 |
| Density (g/cc) | 0.07 | 0.06 |

EXAMPLES 16–18

Corn starch containing 13.9% of water, PVA (a saponification degree: 99.0 mole %, a polymerization degree: 1,100, a particle size: under 10 meshes) containing 29.5% of water, a nonionic surfactant (polyoxyethylene nonylphenyl ether, HLB=17) and boric acid were introduced to a Henschel mixer in amounts given in Table 7 and mixed.

The mixture was melted and kneaded in a twin-screw extruder (a diameter: 30 mm, L/D=30) at a cylinder temperature of 110° C. and a screw speed of revolution of 130 r.p.m. and extruded through a die having two nozzles each having a diameter of 5 mm at a die temperature of 110° C. to obtain compounded pellets which were not foamed. The pellets were dried with a hot-air dryer or sprinkled with water to control a water content.

The compounded pellets thus obtained were dry-blended with talc (for resin reinforcement, particle size: 1.7 μm) in amounts given in Table 7 and extrusion molded through a die with a twin-screw extruded (a diameter: 30 mm, L/D=30) at a cylinder temperature of 160° C., a die temperature of 150° C. and a screw speed of revolution of 130 r.p.m. to obtain a foam.

The composition and the properties of the compound and the foam are summarized in Table 7.

TABLE 7

|  | Example 16 | Example 17 | Example 18 |
|---|---|---|---|
| Composition (parts): |  |  |  |
| Corn starch | 81.3 | 81.3 | 69.7 |
| PVA | 42.8 | 42.8 | 57.1 |
| Nonionic surfactant | 2 | 2 | 2 |
| Boric acid | 0.5 | 1.0 | 0.5 |
| Talc | 5 | 5 | 5 |
| Properties of compound: |  |  |  |
| Water content (%) | 12.7 | 12.0 | 12.8 |
| Melt viscosity ($\times 10^4$ poise) | 1.5 | 1.8 | 2.1 |
| Properties of foam: |  |  |  |
| Condition of foaming | Good | Good | Good |
| Cell structure | Closed | Closed | Closed |
| Cell size (mm) | 0.5–1.0 | 0.5–0.8 | 0.3–0.6 |
| Density (g/cc) | 0.07 | 0.07 | 0.07 |

EXAMPLES 19–20

In the same methods as in Example 16 except that potato starch containing 15.2% of water was used in place of corn starch containing 13.9% of water, and that PVA (a saponification degree: 86.5%, a polymerization degree: 1,700, a particle size: below 2 mm) was used in Example 19 and a saponified product of a copolymer of polyoxyethylene allyl ether and vinyl acetate (a polyoxyethylene ally ether content: 5 mole %, a condensation degree of oxyalkylene group: 10, a saponification degree: 98.5 mole %, a polymerization degree: 700, a particle size: below 2 mm) was used in Example 20 as the polyvinyl alcohol resin, the components were mixed, compounded pellets were prepared, and extrusion forming was effected.

The compositions and the properties of the compounds and the foams are summarized in Table 8.

TABLE 8

|  | Example 19 | Example 20 |
|---|---|---|
| Composition (parts): |  |  |
| Potato starch | 82.5 | 82.5 |
| Vinyl alcohol resin | 42.9 | 42.9 |
| Nonionic surfactant | 2 | 2 |
| Boric acid | 0.5 | 0.3 |
| Talc | 5 | 5 |
| Properties of compound: |  |  |
| Water content (%) | 13.8 | 14.2 |
| Melt viscosity ($\times 10^4$ poise) | 2.3 | 1.7 |
| Properties of foam: |  |  |
| Condition of foaming | Good | Good |
| Cell structure | Closed | Closed |
| Cell size (mm) | 0.3–0.6 | 0.3–0.6 |
| Density (g/cc) | 0.04 | 0.04 |

EXAMPLES 21–23

Corn starch containing 14% of water, PVA (a saponification degree: 99.0 mole %, a polymerization degree: 1,100, a particle size: under 10 meshes) containing 30% of water, a nonionic surfactant (polyoxyethylene nonylphenyl ether, HLB=17) and boric acid were introduced to a Henschel mixer in amounts given in Table 9 and mixed.

The mixture was melted and kneaded in a twin-screw extruder (a diameter: 30 mm, L/D=30) at a cylinder temperature of 110° C. and a screw speed of revolution of 130 r.p.m. and extruded through a die having two nozzles each having a diameter of 5 mm at a die temperature of 110° C. to obtain compounded pellets which were not foamed. The pellets were dried with a hot-air dryer to control a water content as shown in Table 9.

The compounded pellets thus obtained were dry-blended with talc (for resin reinforcement, a particle size: 1.7 μm) and injection molded under the following conditions to obtain a foam.

Injection molding machine: PS60E12ASE-type, Nissei Jushi Industries Ltd.
Injection temperature at discharging section of screw:
Example 21: 180° C.; Example 22: 180° C.; Example 23: 160° C.
Mold temperature:
Example 21: 40° C.; Example 22: 40° C.; Example 23: 40° C.
Shearing rate at nozzle:

| Example 21 | $3 \times 10^3$ sec$^{-1}$ |
| Example 22 | $1.9 \times 10^5$ sec$^{-1}$ |
| Example 23 | $1.9 \times 10^5$ sec$^{-1}$ |

Extrusion pressure:

| Example 21 | 450 kg/cm$^2$ |
| Examples 22 and 23 | 1800 kg/cm$^2$ |

The compositions and the properties of the compounds and the foams are summarized in Table 9.

TABLE 9

|  | Example 21 | Example 22 | Example 23 |
| --- | --- | --- | --- |
| Composition (parts): | | | |
| Corn starch | 81.3 | 81.3 | 81.3 |
| PVA | 42.8 | 42.8 | 42.8 |
| Nonionic surfactant | 2 | 2 | 2 |
| Boric acid | 0.5 | 1.0 | 0.5 |
| Talc | 5 | 5 | 5 |
| Properties of compound: | | | |
| Water content (%) | 12.7 | 12.0 | 12.8 |
| Melt viscosity ($\times 10^4$ poise) | 1.5 | 1.8 | 2.1 |
| Properties of foam: | | | |
| Condition of foaming | Good | Good | Good |
| Cell structure | Closed | Closed | Closed |
| Cell size (mm) | 0.2 | 0.2 | 0.2 |
| Density (g/cc) | 0.05 | 0.05 | 0.05 |

EXAMPLES 24-25

In the same methods as in Example 21 except that potato starch containing 15.2% of water was used in place of corn starch containing 14% of water, and that PVA (a saponification degree: 86.5%, a polymerization degree: 1,700, a particle size: below 2 mm) was used in Example 24 and a saponified product of a copolymer of polyoxyethylene allyl ether and vinyl acetate (a polyoxyethylene ally ether content: 5 mole %, a condensation degree of oxyalkylene group: 10, a saponification degree: 98.5 mole %, a polymerization degree: 700, a particle size: below 2 mm) was used in Example 25 as polyvinyl alcohol resin, the components were mixed, compounded pellets were prepared, and injection foaming was effected.

The compositions and the properties of the compounds and the foams are summarized in Table 10.

TABLE 10

|  | Example 24 | Example 25 |
| --- | --- | --- |
| Composition (parts): | | |
| Potato starch | 82.5 | 82.5 |
| Vinyl alcohol resin | 42.9 | 42.9 |
| Nonionic surfactant | 2 | 2 |
| Boric acid | 0.5 | 0.3 |
| Talc | 5 | 5 |
| Properties of compound: | | |
| Water content (%) | 13.8 | 14.2 |
| Melt viscosity ($\times 10^4$ poise) | 2.3 | 1.7 |
| Properties of foam: | | |
| Condition of foaming | Good | Good |
| Cell structure | Closed | Closed |
| Cell size (mm) | 0.1 | 0.1 |
| Density (g/cc) | 0.07 | 0.06 |

According to the present invention, there can be provided a biodegradable resin foam of a low density having fine closed cells which shows a good surface condition in the molded body.

What is claimed is:

1. A process for producing a biodegradable resin foam, comprising the steps of mixing a starch polymer containing from 5% by weight to 30% by weight of water, a vinyl alcohol resin containing from 5% by weight to 30% by weight of water, a nonionic surfactant and an inorganic or organic filler; optionally adjusting the water content of the mixture, to prepare a composition having from 5% by weight to 30% by weight of water on the whole, based on the total weight of the composition; melting and expanding it to prepare a foam.

2. A process as claimed in claim 1, wherein the organic filler is a vegetable fibrous material.

3. A process as claimed in claim 1, wherein the inorganic filler is talc.

4. A process as claimed in claim 1, wherein said composition further comprises a thickening agent, and a water content of said composition if from 5% by weight to 30% by weight.

5. A process as claimed in claim 4, wherein said composition is melted at a temperature of from 130° C. to 200° C., and a shear rate of the melt which is passing through a nozzle of a molding machine is at least $10^3$ sec$^{-1}$.

* * * * *

UNITED STATES PATENT AND TRADEMARK OFFICE
CERTIFICATE OF CORRECTION

PATENT NO. : 5,308,879
DATED : May 3, 1994
INVENTOR(S) : Yoshimi AKAMATU and Masahiko TOMORI It is certified that error appears in the above-indentified patent and that said Letters Patent is hereby corrected as shown below:

On the title page, item [75], correct the name of the second inventor to read

--Masahiko Tomori--.

Signed and Sealed this

Thirtieth Day of August, 1994

Attest:

BRUCE LEHMAN

*Attesting Officer*    *Commissioner of Patents and Trademarks*